United States Patent [19]

Feder

[11] Patent Number: 4,512,732
[45] Date of Patent: Apr. 23, 1985

[54] HEAT TREATING OF MATERIAL IN FINELY DIVIDED FORM

[75] Inventor: Friedhelm R. Feder, Collierville, Tenn.

[73] Assignee: Wedco Incorporated, Bloomsbury, N.J.

[21] Appl. No.: 503,467

[22] Filed: Jul. 20, 1983

Related U.S. Application Data

[60] Division of Ser. No. 416,747, Sep. 10, 1982, Pat. No. 4,421,703, which is a continuation of Ser. No. 139,630, Apr. 14, 1980, abandoned.

[51] Int. Cl.³ .............................................. B29B 1/03
[52] U.S. Cl. .................................. 425/222; 264/40.1; 264/117
[58] Field of Search ............................. 425/6, 8, 222; 264/40.1, 68, 117

[56] References Cited

U.S. PATENT DOCUMENTS

| Re. 22,002 | 1/1942 | Beken | 259/104 |
|---|---|---|---|
| 1,200,070 | 10/1916 | Banbury | 366/91 |
| 1,767,102 | 8/1930 | Thorne | 366/297 |
| 2,441,222 | 5/1948 | Fuller | 366/84 |
| 2,550,802 | 5/1951 | Gholson | 23/314 |
| 2,794,626 | 6/1957 | Sterritt | 259/104 |
| 2,861,294 | 11/1958 | Glaxner et al. | 425/22 |
| 3,049,750 | 8/1962 | Austin | 425/22 |
| 3,229,002 | 1/1966 | Feder | 264/15 |
| 3,244,408 | 4/1966 | Brownlie et al. | 259/6 |
| 3,320,581 | 5/1967 | Tyson et al. | 259/6 |
| 3,472,491 | 10/1969 | Feder | 259/6 |
| 3,901,482 | 8/1975 | Kieffaber | 259/6 |

FOREIGN PATENT DOCUMENTS 575415 5/1959 Canada .
880406 9/1971 Canada .

Primary Examiner—Caleb Weston
Attorney, Agent, or Firm—Sprung Horn Kramer & Woods

[57] ABSTRACT

Heat treatment of a material, e.g. a finely divided resin, wherein the material is introduced into a drum and agitated by rotating, spaced blades which whirl the material into a dispersion. The action of the blades heats the resin particles so that heat for the heat treatment is provided. The heat treatment can be, e.g. to cause small resin particles to coalesce with larger particles in the processing of polyethylene reactor flake, to improve flowability of the resin, or to admix resin and additive. To obtain increased capacity while the size of the apparatus is maintained within reasonable limits, two intersecting, generally cylindrical drums, each outfitted with an agitator, are used. Apparently the dispersions of the respective agitators slam into each other in the vicinity of the intersection causing additional heating.

15 Claims, 7 Drawing Figures

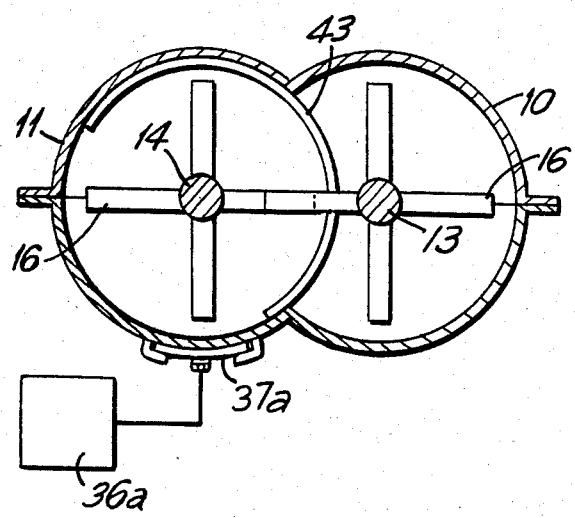
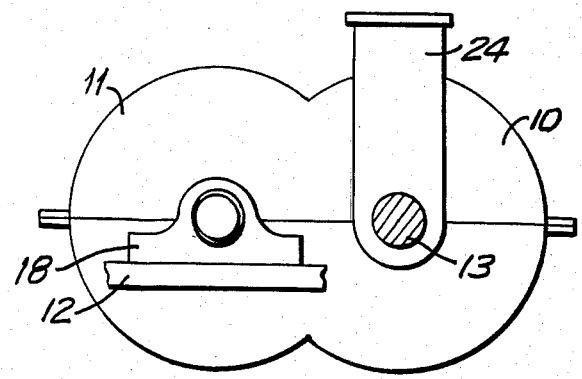
FIG.3　　　　　FIG.4
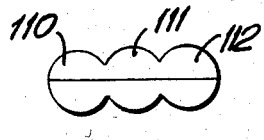
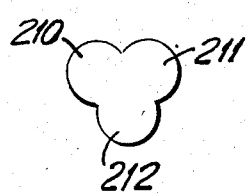
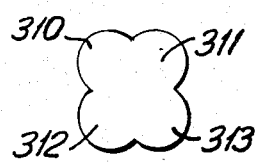
FIG.5　　FIG.6　　FIG.7

HEAT TREATING OF MATERIAL IN FINELY DIVIDED FORM

This is a division of application Ser. No. 416,747, filed Sept. 10, 1982 now U.S. Pat. No. 4,421,703, which in turn was a continuation of U.S. patent application Ser. No. 139,630 filed Apr. 14, 1980, now abandoned.

BACKGROUND OF THE INVENTION

Feder U.S. Pat. No. 3,229,002 was the outcome of development of a process for treating resin paricles, e.g. −35 mesh polyethylene, to improve the flowability of the particles so that the polyethylene would be better suited for use in injection molding and in the production of rug backings. Briefly, the treatment involves passing the resin through a drum in which a rotor having spaced blades or rods hurls the material into a dispersion. The material is heated by this action and this causes changes which improve the flowability.

Subsequently, the process was applied to the blending of various materials, e.g. pigments and waxes, with resin particles. That extension resulted in Feder U.S. application Ser. No. 772,894, filed Feb. 28, 1977, abandoned in favor of Ser. No. 240,441 filed Mar. 4, 1981 which in turn was abandoned in favor of Ser. No. 368,328, filed Apr. 14, 1982. Here again heating is utilized, as the heating causes the resin and the additive to coalesce.

More recently, attempts were made to apply the process to the treatment of reactor fluff or flake. The fluff is a polymer as it is produced in a reactor. The polymers of interest were polyethylene and polypropylene, particularly polyethylene. The polymer is in the form of particles of varying sizes. By reason of the variation in particles size, the fluff is not suitable for use by some converters.

In, for example, blow molding, the molder extrudes the polyethylene into a tube which is cut, and the resulting parts are molded by blowing. The fluff, with its great variation in particle size, is unsuitable for transportation to and use by the molder in his extruder. In the fluff, the small particles have a high melt index and the large particles have a low melt index. Apparently, these conditions, together with segregations with respect to particle size, render the fluff unsuitable for extrusion by the molder. To remedy that situation, the practice in the industry is that the prime producer of the polyethylene extrudes the fluff, and forms the extrusion product into pellets. The extrusion by the prime producer is a high power consumption operation, and, additionally, the accompanying heat causes some degradation.

Efforts were made to utilize the process and apparatus of the aforementioned patent to blend the large and small fluff particles, into particles composed of both the large and small particles. In the process of the Feder patent heat is utilized to effect the desired treatment, and in respect to the fluff the small particles stick to or melt onto the larger particles. The product produced from the fluff, while not of the uniform size which is usual for pellets, appeared to be quite adequate for the needs of the molder, while in the inventor's process power consumption is substantially less and there is no degradation.

However, the capacity which the prime producers require is much larger than can be provided by the present apparatus, i.e. the apparatus disclosed in the Feder patent. The problem could be dealt with by enlarging the size of the apparatus, but the size which would result would be such as to make the agitator unattractive to the prime producers.

SUMMARY OF THE INVENTION

The problem was solved by utilizing intersecting drums instead of the drum as was utilized heretofore. See FIG. 1 and FIG. 2 of the accompanying drawings. Each drum is outfitted with a rotor having blades at spaced intervals. Preferably the rotors rotate in the same direction. The rotors are rotated at high speed and hurl the resin particles into a dispersion, so that in each drum a rotating doughnut tends to form. The relative movement of the blades and the dispersion causes heating which contributes to the heat treatment. In the new process, in the open area between the two drums, the doughnuts slam into each other, and this gives rise to substantial further heating with the result that increased capacity is realized, while at the same time the apparatus is not unduly large.

Thus, the invention provides a process for heat treating a material which comprises introducing the material into at least one of at least two intersecting, axially parallel disposed generally cylindrical drums, filled with a fluid, and heating and dispersing the material in the fluid at least in the vicinity of the wall of each drum throughout the circumference of each drum by agitating the material with a rotor disposed over a length of each drum and having radially projecting, axially spaced blades for effecting the agitation. The intersection of the drums provides an open area between the two drums, and the agitation causes particles from one drum to mix with particles of the other drum in the vicinities on either side of the open area. The temperature of the material in the drum is controlled by temperature control means, and the heat treated material, e.g. resin, is withdrawn from at least one of the drums at a location across the agitators from the location where the resin is introduced. As to the fluid in the apparatus, a gas, usually air is particularly contemplated.

While the new process was developed especially for the coalescing of reactor flake, such as polyethylene or polypropylene flake, it can be utilized for improving flowability, and also for the mixing of additives, e.g. pigment, with a polymer. In both improving flowability and in admixing, by reason of the new process, capacity is increased.

BRIEF DESCRIPTION OF THE DRAWINGS

An embodiment of the invention is illustrated in the accompanying drawings, of which:

FIG. 3 and FIG. 4, are taken, respectively, along lines 3—3 and 4—4 of FIG. 2;

FIGS. 5, 6, and 7 illustrate alternative embodiments.

DETAILED DESCRIPTION OF THE INVENTION

Figure 1:
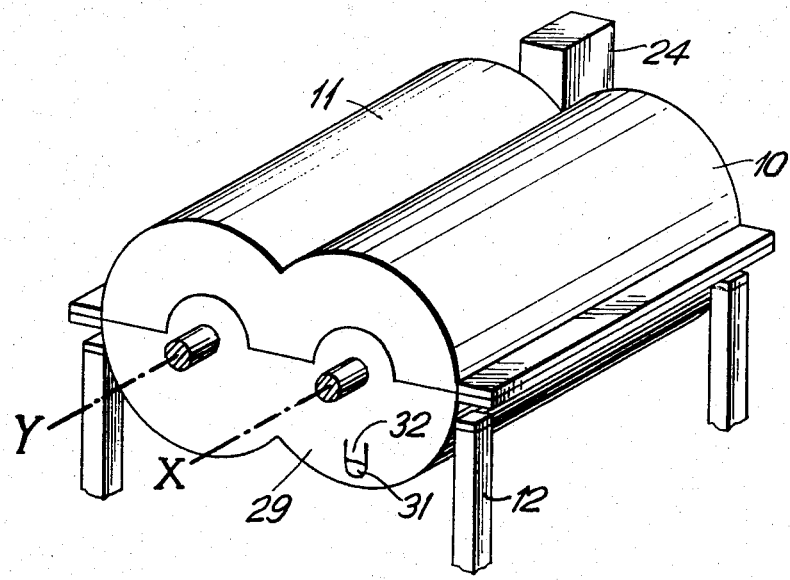
FIG. 1 is an isometric view of the apparatus for carrying out the process according to the invention.
Figure 2:
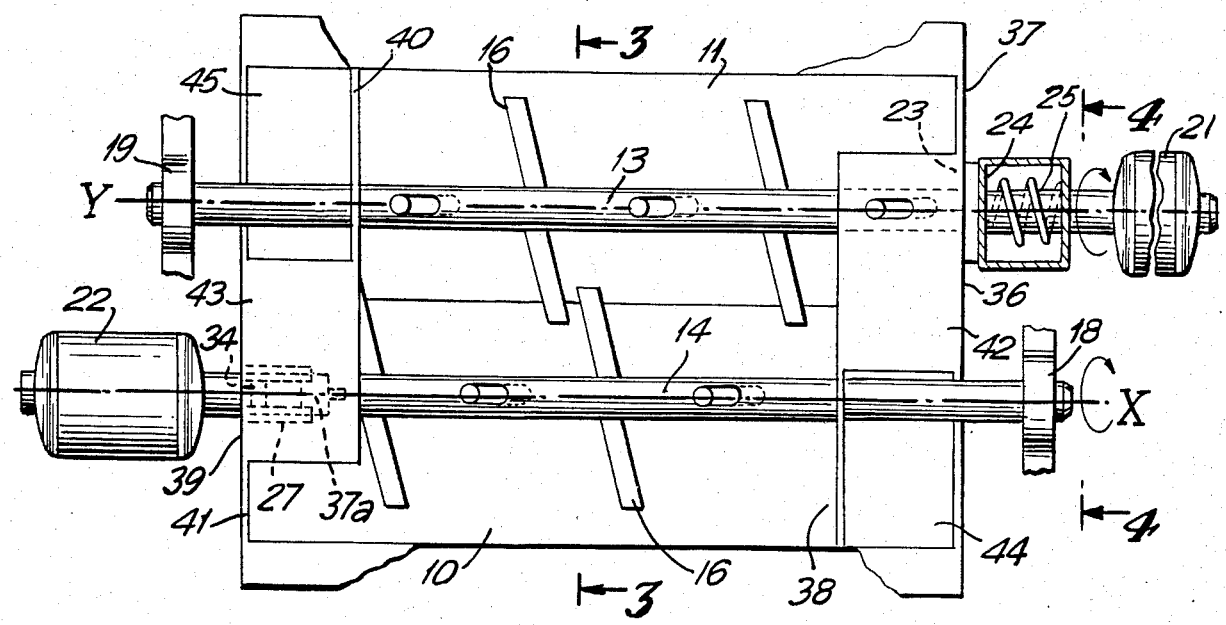
FIG. 2 is a plan view of the apparatus of FIG. 1 with the top cover removed.

In the embodiment illustrated in FIGS. 1-4, the apparatus comprises two intersecting axially disposed, generally cylindrical drums 10, and 11. The drums are mounted on a frame 12 and are disposed so that their axes X, Y, which are disposed along the shafts 13 and 14, are horizontal. The bottom half of the two drums are constructed as an integral piece and the upper halves are likewise constructed. As can be seen in FIG. 2, where the top portion or half of the apparatus has been removed, rotatively mounted rotors 13 and 14 are respectively, disposed in drums 11 and 10. The rotors have radially projecting axially spaced blades 16 disposed over a length of each drum. Blades of one of the rotors axially overlap with blades of the other rotors. The blades are bent so that they are not perpendicular to the axes of the rotors. The bending of the blades is provided so that both halves of each blade do not travel in the same path. While the bending represents a preferred construction, it is not necessary. The rotor shafts are mounted in journals 18 and 19, and are driven by motors 21 and 22. The motors rotate the rotors in the same direction. The rotors could be rotated in opposite directions, but in that case, preferably, they are rotated at different rates. An inlet opening 23 is provided in one end of one of the drums. A chute 24 is provided for feeding the material to the drum. The chute 24 is outfitted with an auger 25 for forcing the material into the drum. An outlet opening 27 is provided in drum 10. The outlet is disposed at a circumferential periphery of the drum, i.e. it is an opening in the bottom of the drum or an opening between the bottom of the drum and the lower extremity of the end wall 39. Preferably, the outlet is an opening in the bottom of the drum.

As is apparent from FIG. 2, the apparatus inlet end 36 is composed of two parts 37 and 38 which are offset, and the apparatus outlet end 39 is composed of two parts 40 and 41 which are also offset. Shields 42 and 43 accommodate the offsets by closing openings which would result from the offsets in the absence of the shields. For convenience, various walls of the apparatus are extended so that dead spaces 44 and 45 result. Consequently, the offsets are not apparent in FIG. 1.

In some operations, to some extent, relatively large balls of resins form during the heat treatment, and tend to accumulate at a radially inward level in the apparatus. To accommodate that condition, a second discharge opening 31 can be provided in the end wall at the end from which the resin is withdrawn. This second discharge opening is disposed radially inwardly of the circumferential periphery of the drum. Desirably, a slide plate 32 is provided so that the size of the opening can be adjusted.

In the embodiment of FIGS. 1–4, the inlet opening 23 is disposed in one of the drums, namely drum 11, and the outlet opening 27 is disposed in the other of the drums, namely drum 10. Drum 10, which has the outlet opening, extends axially beyond the other drum, i.e. the drum 10 extends to the left of drum 11, as viewed in FIG. 2. Outlet opening 27 is disposed in the part of drum 10 which extends axially beyond drum 11. A scraper 34 is provided for the discharge end 29 for scraping any material tending to adhere to the discharge end wall. If the rotors were not axially offset, as is shown in FIG. 2, then it would be necessary to provide the discharge end wall of each drum with a scraper. For good scraping, it would then be necessary to synchronize the rotation of the rotors. That is of course possible, but is expensive. The use of just one motor to drive both rotors would, of course, facilitate synchronization. But for motors of the size used in the practice of the invention, it is less expensive to use two motors. The motors are not synchronized, that is they operate independently of each other.

In the construction illustrated, scrapers other than scraper 34 are not required though it may be desirable to provide a scraper at the inlet end of drum 11. While the construction indicated in FIG. 2 is preferred, and the offset at the left end, as seen in FIG. 2, is for the purpose described, it is believed that the offset at the right hand end is not necessary.

Temperature control means 36a are provided for controlling the temperature within the drum. The temperature control means 36a can sense energy input for the heating of the material, as is described in Feder U.S. Pat. No. 3,472,491. A slide valve 37a is provided for adjusting the size of outlet opening 27, and the slide is operatively connected to the energy means 36a for changing the size of the outlet opening for controlling the temperature of the material, for example as is described in said U.S. Pat. No. 3,472,491. For the temperature control, the temperature within the apparatus can be measured by a thermocouple disposed 3 or 4 inches from the outlet and about 1" radially inward of the shell. The amps drawn by one or both of the motors can be measured.

Preferably, in order to avoid size reduction, the drums have smooth inner surfaces, i.e. the inner surfaces are uniformly cylindrical, and are without variation in diameter.

In the embodiment shown in FIG. 2, the blades of the respective rotors, intermesh. While that is preferred, it is not essential.

While practice of the invention with particular materials has been mentioned above, other materials can also be treated. Thus, the invention can be utilized to densify expanded polystyrene.

The invention can be also be utilized for treatments as are the subject of European Patent Application No. 0 002 271 A 1, for example, for the treatment of butadiene-styrene rubber solutions, as are treated in the European patent application. The invention is particularly applicable to heat treating of thermoplastic materials, especially thermoplastic resins and polymers.

By heat treatment is meant that the material is heated and as a consequence of the heating, following the withdrawal of the material from the apparatus and cooling to ambient temperature, a physical or chemical condition of the material or materials is significantly different than it was initially.

In the operation of the invention, the effect of the agitation is analogous to the effect of a horizontally disposed centrifuge on a liquid fed to the machine. The material treated forms a level depending on the rate of feed and withdrawal, the level being the difference between the inside and outside diameter of the rotating dispersion or liquid. The tendency for the material to seek its own level causes the flow from the inlet to the outlet.

If desired, more than two intersecting drums can be used. Thus, the arrangements of FIGS. 5–7 can be used wherein three intersecting drums 110, 111, 112 or 210, 211, 212 are provided or four intersecting drums 310, 311, 312, 313 are provided.

In the embodiment of FIGS. 1–4, only one drum is provided with an inlet and only one drum is provided with an outlet. If desired, each drum could be provided with an inlet and each drum could be provided with an outlet. The same applies to the embodiments of FIGS. 5–7. In all cases, if there is more than one inlet the inlets are at the same end, and if there is more than one outlet, then the outlets are all at the same end, and the inlets and outlets are at opposite ends of the apparatus.

Reference is made to disclosure document No. 084594, filed Sept. 26, 1979, by the applicant herein, and the same is incorporated herein by reference.

What is claimed is:

1. An apparatus suitable for the heat treatment of material comprising
    at least two intersecting, axially disposed, generally cylindrical drums,
    a rotatably mounted rotor disposed in each drum, said rotor having radially projecting, axially spaced blades disposed over a length of each drum, at least some of the blades of the rotors axially overlapping,
    an inlet opening in at least one of the drums for introduction of the material into one end portion of the apparatus,
    a first outlet opening in at least one of the drums for withdrawal of the material from the other end portion of the apparatus, the first outlet opening being disposed at the circumferential periphery of the drum,
    an end wall disposed at the end from which the material is withdrawn, and
    a second outlet opening disposed in said end wall radially inwardly of the circumferential periphery of the drum.

2. An apparatus according to claim 1, further comprising a means for sensing energy input for the heating of the material and a means for controlling the size of the first outlet opening operatively connected to the energy sensing means for changing the size of the first outlet opening for controlling the temperatures of the material.

3. An apparatus according to claim 1, wherein the blades are bent so that the blades are not perpendicular to the axes of the rotors.

4. An apparatus according to claim 1, wherein the inner walls of the drums are smooth.

5. An apparatus according to claim 1, further comprising a frame for the drums, the drums being disposed on the frame with the axes thereof horizontal.

6. An apparatus according to claim 1, further comprising a motor for rotating each of the rotors, the motors operating independently of each other.

7. An apparatus according to claim 6, wherein the motors are connected to the rotors so that the rotors rotate in the same direction.

8. An apparatus suitable for the heat treatment of material comprising
    at least two intersecting, axially disposed, generally cylindrical drums,
    a rotatably mounted rotor disposed in each drum, said rotor having radially projecting, axially spaced blades disposed over a length of each drum, at least some of the blades of the rotors axially overlapping,
    an inlet opening in at least one of the drums for introduction of the material into one end portion of the apparatus, and
    a first outlet opening in at least one of the drums for withdrawal of the material from the other end portion of the apparatus, the first outlet opening being disposed at the circumferential periphery of the drum, the first outlet opening being in the other of the drums which does not have the inlet opening, the drum having the first outlet opening extending axially beyond the drum having the inlet opening so that a portion of the drum having the first outlet opening is offset, the first outlet opening being disposed in said offset portion, and
    a scraper disposed in the discharge and of the drum having the first outlet opening, for scraping away any material tending to adhere to said discharge end.

9. An apparatus according to claim 8, wherein the blades are bent so that the blades are not perpendicular to the axes of the rotors.

10. An apparatus according to claim 8, wherein the inner walls of the drums are smooth.

11. An apparatus according to claim 8, wherein the inner walls of the drums are smooth.

12. An apparatus according to claim 8, further comprising an end wall disposed at the end from which the material is withdrawn, and a second outlet opening disposed in said end wall radially inwardly of the circumferential periphery of the drum.

13. An apparatus according to claim 8, further comprising a means for sensing energy input for the heating of the material and a means for controlling the size of the first outlet opening operatively connected to the energy sensing means for changing the size of the first outlet opening for controlling the temperature of the material.

14. An apparatus according to claim 8, further comprising a motor for rotating each of the rotors, the motors operating independently of each other.

15. An apparatus according to claim 14, wherein the motors are connected to the rotors so that the rotors rotate in the same direction.

* * * * *